Feb. 26, 1957　　　I. NESSON　　　2,782,450
WIPER ARM SPRING
Filed Jan. 17, 1955
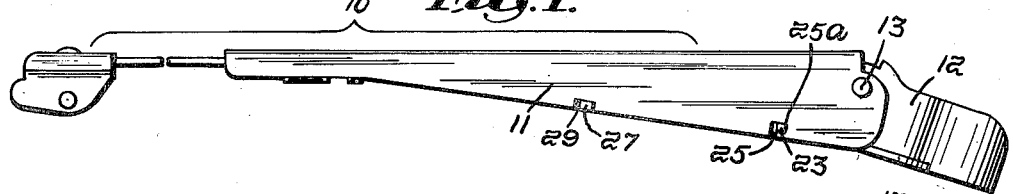
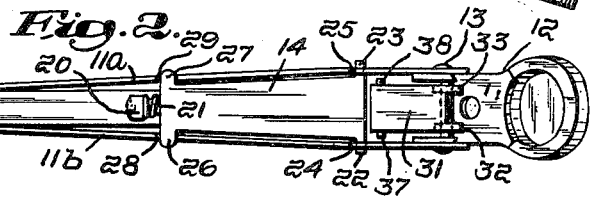
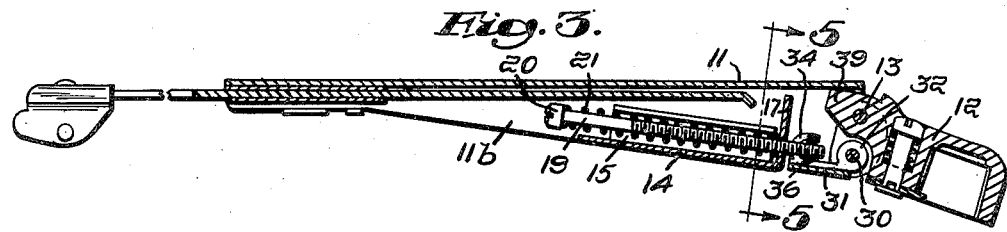
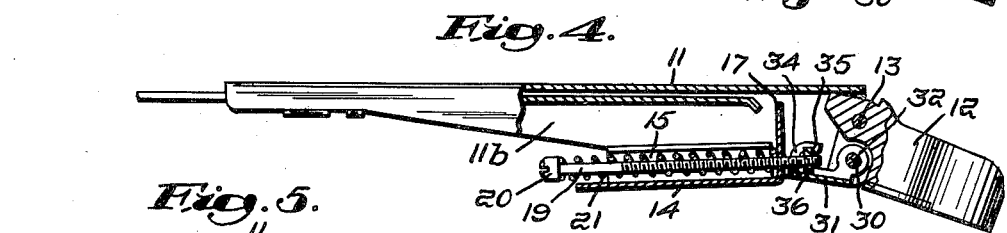
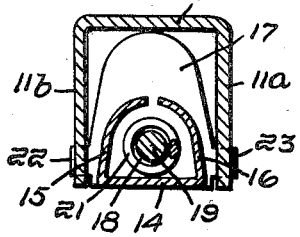
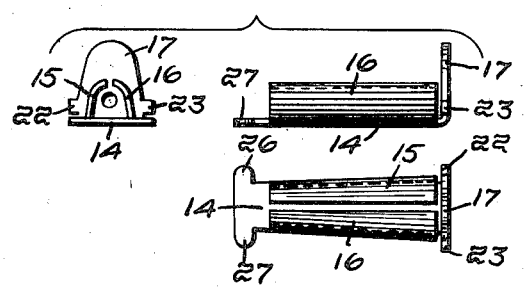
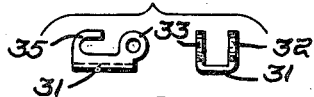
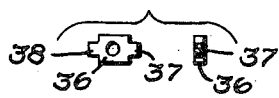
Inventor:
Israel Nesson,
by Arthur D. Thomson
Attorney United States Patent Office 2,782,450
Patented Feb. 26, 1957

2,782,450
WIPER ARM SPRING

Israel Nesson, Lynn, Mass., assignor to Max Zaiger, Swampscott, Mass.

Application January 17, 1955, Serial No. 482,303

7 Claims. (Cl. 15—255)

This invention relates to windshield wiper arms, and pertains more particularly to spring devices for achieving the desired pressure between the wiper blade and the windshield.

In the type of windshield wiper for which the device here disclosed is adapted, the wiper arm is hinged to a coupling member which is attached to the drive shaft of the wiper motor, and is urged toward the windshield by means of a tension spring connected to the arm and to some point on the coupling. The arm can be pulled away from the windshield, against the force of the spring, far enough to permit changing the blade, and when the blade is in its usual position, the spring is slightly flexed to produce the desired pressure between the blade and the windshield. The pressure should be sufficient to produce a clean wipe, but too much pressure will sometimes cause the blade to stick and, in any case, puts undue strain on the motor and causes the blade to wear rapidly. The arm is usually provided with a stop which limits inward swing toward the windshield and the spring is ordinarily assembled on to the arm and coupling under tension with the arm in its extreme inward position. It is rather difficult to assemble the spring in this manner and obtain the correct tension. Furthermore, the spring tension cannot be adjusted readily or with any degree of accuracy in the field to compensate for such factors as dimensional variations in the mounting, wear of the wiper strip and fatigue of the spring. Users frequently resort to bending the arm itself to relieve or increase pressure on the blade.

The general object of this invention is to provide a device which facilitates accurate adjustment of the spring pressure on a hinged wiper arm, both at the place of manufacture and in the field, which is easy to assemble, and which maintains its adjustment indefinitely. Another object is to produce a spring assembly which can be connected to the arm and the coupling with the spring relaxed, the spring being subsequently adjusted to give the desired pressure. Other advantages will be apparent from the description which follows.

The device consists in general of a spring housing, normally engaged with the arm, containing a screw surrounded by a coil spring, the screw engaging a piece which is hinged to the arm coupling and being secured by a nut. The spring force is applied to the arm by compression rather than tension of the spring. The housing is provided with lugs which engage notched slots in the arm. The lugs will pivot in the notches so that the housing may be swung away from the arm to permit access to the screw for adjustment, but the housing is normally held in alignment with the arm by the spring force.

In the drawings illustrating the invention:

Fig. 1 is a side view of a wiper arm on which a spring device embodying the invention is assembled;

Fig. 2 is a bottom view of the arm and spring device;

Fig. 3 is a longitudinal cross-section of the arm with the spring device shown in operating position;

Fig. 4 is a longitudinal cross-section of the arm with the spring device swung out for adjustment;

Fig. 5 is an enlarged cross-section along line 5—5 of Fig. 3;

Fig. 6 is a detail showing top, side and end views of the spring housing;

Fig. 7 is a detail showing side and end views of the yoke in which the nut securing the adjusting screw is mounted; and Fig. 8 is a detail showing side and end views of the nut which secures the adjusting screw to the arm coupling.

The arm, generally indicated by the numeral 10, has a channel-shaped base portion 11 with legs 11a and 11b, which is hinged to the coupling housing 12 by means of a pin 13. The coupling device for connecting the coupling housing to the motor shaft is not here shown in detail but may be of any suitable type, for example, that shown in my previous Patent No. 2,417,991. The arm here illustrated is of a telescoping type which is described in detail and claimed in my copending application, Serial No. 485,739 filed February 2, 1955, but may be of any conventional hinged type having a suitable base for receiving the spring assembly.

Mounted inside the base 11 is the spring housing 14. This housing is preferably made of sheet metal and has curved side walls 15 and 16 and an upturned end wall 17 having an opening 18 through which the adjusting screw 19 passes freely. The screw preferably has a head 20, and the coil spring 21 which freely encircles the screw bears against this head at one end and against wall 17 at the other. Instead of the headed screw a threaded stud may be used with a nut to take the place of head 20.

End wall 17 carries a pair of sidewardly projecting lugs 22 and 23, and legs 11a and 11b have slots 24 and 25 leading to notches 24a and 25a (not shown) in which lugs 22 and 23 are normally rotatably engaged. When the spring housing is in place in the arm base, as shown in Fig. 3, the center of pressure of the spring against end wall 17 lies above the center of rotation of lugs 22 and 23 in notches 24a and 25a, so that the spring force tends to swing the spring housing upward, or inward with respect to the arm base. The spring housing also has a pair of lugs 26 and 27 which ordinarily engage in notches 28 and 29 in legs 11a and 11b, respectively. These lugs limit the inward swing of the spring housing with respect to the arm base, and also provide a finger grip for pulling the spring housing out of the base for adjustment.

Journalled on a pin 30 on the coupling housing 12 is the trunnion yoke 31 which is shown in detail in Fig. 6. This yoke is generally U-shaped and has two upturned lugs 32 and 33, with holes through which pin 30 passes, and two hook-shaped arms 34 and 35. A trunnion nut 36, shown in detail in Fig. 8, has ears 37 and 38 which engage under arms 34 and 35, and is threaded to receive the end of screw 19. As this nut is rather loosely held and rotatable in the arms 34 and 35, and the trunnion yoke is also rotatable on pin 30, the spring assembly is free to swing back and forth, along with arm 10, with respect to the coupling housing 12.

The coupling housing is provided with a tongue 39, which engages the upper wall of the channel 10 and limits the swing of the arm in the counterclockwise direction, as viewed here, with respect to the coupling, that is, the direction toward the windshield. The spring is normally adjusted to be slightly compressed when the arm is against this stop. For initial assembly, the spring is relaxed so that the lugs 22 and 23 can be easily slid up through slots 24 and 25 to engage in notches 24a and 25a. The screw 19 is then tightened to produce the desired compression on the spring. As previously stated, the force of the spring tends to swing the housing into alignment with the arm and maintain it in this position.

To make any subsequent adjustment of the spring pressure on the arm, the spring housing is grasped by lugs 26 and 27 and swung out from the arm base, as indicated in Fig. 4. The spring pressure is then increased or decreased as desired by tightening or loosening the screw 19.

This arrangement permits fine, accurate adjustment of the spring pressure when the arm is first assembled at the factory, and subsequent adjustment in the field to suit various conditions is also a simple matter. The initial assembly of the spring on to the arm is much easier than the assembly of conventional tension spring arrangements. Furthermore, as the spring is under compression, it is less susceptible to fatigue and breakage than the conventional tension spring.

What is claimed is:

1. A spring assembly, for a wiper arm of the type hinged to an arm coupling, comprising a spring housing having an end wall adjacent said coupling, a screw mounted in said housing and having an end projecting through said end wall, means connecting said end to said coupling and permitting the screw to swing with respect to the coupling in the same direction as the arm, a coil spring mounted in said housing and encircling said screw, a projection on the other end of said screw bearing on one end of said spring, the other end of the spring bearing on said end wall, said projection being adjustable toward and away from said end wall to vary the spring compression, and means holding said housing in engagement with said arm for swinging movement therewith with respect to the coupling.

2. A spring assembly as described in claim 1, said arm having side walls with free lower edges, the side walls having slots in said lower edges leading to notches in the sides of said slots toward said coupling, and the housing having lugs normally held in engagement with said notches by pressure of the spring and disengageable from the arm through said slots when the spring pressure is relieved.

3. A spring assembly as described in claim 1, having a pivotal connection between said housing and said arm, the spring bearing on said end wall in such a manner as to tend to swing said housing toward said arm, and the housing being swingable away from said arm against the force of the spring to permit access to the screw for adjustment.

4. A spring assembly, for a wiper arm of the type hinged to an arm coupling, comprising a spring housing having an end wall adjacent said coupling, a screw mounted in said housing and having a threaded end projecting through said end wall, a trunnion member hinged on said coupling between the coupling and said end wall and swingable in the same direction as said arm, a nut mounted on said trunnion member and engaging said threaded end, a projection on the opposite end of said screw, a coil spring mounted in said housing and encircling said screw, said spring having one of its ends bearing on said projection and its other end bearing on said end wall, and means normally holding said housing in engagement with said arm for swinging movement with respect to said coupling.

5. A spring assembly as described in claim 4, said trunnion member having a pair of hook-shaped arms bent toward said coupling, and said nut having lugs rotatably engaged with said arms.

6. A spring-pressed wiper arm comprising an arm coupling, an arm hinged to said coupling and having a channel-shaped base with side walls, a spring housing received within said base and having an end wall adjacent said coupling, a screw mounted in said housing and having a threaded end projecting through said end wall, a trunnion member hinged to said coupling and swingable in the same direction as said arm, a nut mounted on said trunnion member and engaging said threaded end, a projection on the other end of said screw, a coil spring mounted in said housing and encircling said screw, one end of said spring bearing on said projection and the other end bearing on said end wall, and means normally holding said housing in engagement with said arm and maintaining said spring and screw within said base.

7. A wiper arm as described in claim 6, having notches in said side walls, the housing having lugs rotatably engaged in said notches, and the spring bearing on said end wall in a region offset from the center of rotation of said lugs in the notches in such a direction as to produce a movement tending to swing said housing toward said base member.

References Cited in the file of this patent

FOREIGN PATENTS 406,426     Great Britain _____ Mar. 1, 1934